US012732915B2

(12) United States Patent
Shen et al.

(10) Patent No.: US 12,732,915 B2
(45) Date of Patent: Sep. 8, 2026

(54) WORKING METHOD AND APPARATUS FOR COMMUNICATIONS DEVICE AND COMMUNICATIONS DEVICE

(71) Applicant: VIVO MOBILE COMMUNICATION CO., LTD., Chang'an Dongguan (CN)

(72) Inventors: Xiaodong Shen, Chang'an Dongguan (CN); Xueming Pan, Chang'an Dongguan (CN); Li Chen, Chang'an Dongguan (CN); Na Li, Chang'an Dongguan (CN); Zichao Ji, Chang'an Dongguan (CN); Dajie Jiang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 517 days.

(21) Appl. No.: 18/355,305

(22) Filed: Jul. 19, 2023

(65) Prior Publication Data

US 2023/0370974 A1 Nov. 16, 2023

Related U.S. Application Data

(63) Continuation of application No. PCT/CN2022/077319, filed on Feb. 22, 2022.

(30) Foreign Application Priority Data

Feb. 22, 2021 (CN) ......................... 202110199027.8

(51) Int. Cl.
*H04W 52/02* (2009.01)

(52) U.S. Cl.
CPC ..... *H04W 52/028* (2013.01); *H04W 52/0235* (2013.01)

(58) Field of Classification Search
None
See application file for complete search history.

(56) References Cited

U.S. PATENT DOCUMENTS

2009/0059829 A1 3/2009 Bachmann et al.
2014/0051419 A1 2/2014 Brend et al.
(Continued)

FOREIGN PATENT DOCUMENTS

CN 102624566 A 8/2012
CN 103916257 A 7/2014
(Continued)

OTHER PUBLICATIONS

Intel Corporation., "Sidelink enhancements for UE power saving," 3GPP TSG RAN WG1 Meeting #103-E, R1-2008998, pp. 1-9, (Oct. 26-Nov. 13, 2020).
(Continued)

*Primary Examiner* — Diane L Lo
(74) *Attorney, Agent, or Firm* — Price Heneveld LLP

(57) ABSTRACT

This application discloses a working method and apparatus for communications device and a communications device, pertaining to the field of communication technologies. The working method for communications device is performed by a first communications device, and the method includes: transitioning from non-sleep state to sleep state in a case that at least one of the following is satisfied, where the first communications device at least detects a wake-up signal in sleep state: a sleep state transition command from a second communications device has been received; and it has been determined that the first communications device meets a preset sleep state transition condition.

18 Claims, 2 Drawing Sheets

Transition from non-sleep state to sleep state in a case that at least one of the following is satisfied:
a sleep state transition command from a second communications device has been received; and
it has been determined that the first communications device meets a preset sleep state transition condition

101

(56) References Cited

U.S. PATENT DOCUMENTS

2014/0155115 A1 6/2014 Keshavarzian
2015/0088278 A1 3/2015 Chang et al.
2017/0048729 A1 2/2017 Jin et al.
2017/0208523 A1 7/2017 Yang et al.
2018/0220366 A1 8/2018 Bergstrom et al.
2018/0351605 A1 12/2018 Liang et al.
2019/0335530 A1 10/2019 Yang et al.
2019/0342833 A1 11/2019 Astrom et al.
2020/0029302 A1 1/2020 Cox et al.
2020/0107262 A1 4/2020 Shaw et al.
2020/0275296 A1 8/2020 Chen et al.
2020/0314868 A1 10/2020 Tseng et al.
2020/0403743 A1 12/2020 Bergqvist et al.
2021/0051590 A1 2/2021 Hakola et al.
2021/0410067 A1 12/2021 Miao et al.
2022/0150833 A1 5/2022 Li
2022/0174603 A1* 6/2022 Maleki .............. H04W 52/0216
2022/0401018 A1 12/2022 Yang
2023/0156594 A1 5/2023 Li
2023/0164732 A1* 5/2023 Lee ....................... H04L 5/0053 455/456.1

FOREIGN PATENT DOCUMENTS

CN 108668524 A 10/2018
CN 109121188 A 1/2019
CN 109495924 A 3/2019
CN 110199550 A 9/2019
CN 110876181 A 3/2020
CN 110958668 A 4/2020
CN 110958674 A 4/2020
CN 111527774 A 8/2020
CN 112020872 A 12/2020
JP 2013046393 A 3/2013
JP 2020509627 A 3/2020
KR 10-2008-0026012 A 3/2008
KR 10-2181856 B1 11/2020
WO 2014/056174 A1 4/2014
WO 2020/128966 A1 6/2020
WO 2020/223654 A1 11/2020
WO 2021/003753 A1 1/2021

OTHER PUBLICATIONS

ETSI MCC., "Report of 3GPP TSG RAN2#112-e meeting, Online," 3GPP TSG-RAN WG2 meeting #113-e, R2-2100001, pp. 1-370, (Nov. 2-13, 2020).
Vivo., "DRX Alignment between TX and RX UEs," 3GPP TSG-RAN WG2 Meeting #113 electronic, R2-2100796, (Jan. 25-Feb. 5, 2021).
International Search Report and Written Opinion of the International Searching Authority dated Apr. 24, 2022 as received in Application No. PCT/CN2022/077319.
CN Office Action dated Oct. 20, 2023 as received in Application No. 202110199027.8.
Indian Examination Report for Appln. No. 202327052635 dated Jan. 5, 2026.

* cited by examiner

Transition from non-sleep state to sleep state in a case that at least one of the following is satisfied:
a sleep state transition command from a second communications device has been received; and
it has been determined that the first communications device meets a preset sleep state transition condition

101

WORKING METHOD AND APPARATUS FOR COMMUNICATIONS DEVICE AND COMMUNICATIONS DEVICE

CROSS-REFERENCE TO RELATED APPLICATIONS

This application is a continuation application of PCT International Application No. PCT/CN2022/077319 filed on Feb. 22, 2022, which claims priority to Chinese Patent Application No. 202110199027.8, filed in China on Feb. 22, 2021, which is incorporated herein by reference in its entirety.

TECHNICAL FIELD

This application relates to the field of communication technologies, and in particular, to a working method and apparatus for communications device, and a communications device.

BACKGROUND

In the design of communications systems, different states of terminals (User Equipment, UE) are introduced, such as idle state (IDLE) and connected state (CONNECTED). After UE has finished data transmission and reception, the UE can transition from CONNECTED state to IDLE state to save power. In the IDLE state, the UE needs to receive only necessary synchronization information, paging (Paging) information, system information blocks (System Information Block, SIB), and the like. As compared with the CONNECTED state, power can be reduced significantly, typically more than ten mW, and such power is one-tenth of or even less than that in the CONNECTED state.

However, in the foregoing design of the IDLE state, the terminal still needs to periodically turn on a transceiver and a signal processing module of a corresponding modem (MODEM) to process the received signal accordingly. Such radio frequency (RF) and MODEM modules cannot be truly turned off completely, making it difficult to reduce power consumption of communication in the IDLE state.

SUMMARY

According to a first aspect, an embodiment of this application provides a working method for communications device, performed by a first communications device, where the method includes:

transitioning from non-sleep state to sleep state in a case that at least one of the following is satisfied:

a sleep state transition command from a second communications device has been received; and it has been determined that the first communications device meets a preset sleep state transition condition.

According to a second aspect, an embodiment of this application provides a working apparatus for communications device, applied to the first communications device, where the apparatus includes:

a processing module configured to transition from non-sleep state to sleep state in a case that at least one of the following is satisfied:

a sleep state transition command from a second communications device has been received; and it has been determined that the first communications device meets a preset sleep state transition condition.

According to a third aspect, an embodiment of this application provides a communications device, where the communications device includes a processor, a memory, and a program or instructions stored in the memory and capable of running on the processor, and when the program or instructions are executed by the processor, the steps of the foregoing method are implemented.

According to a fourth aspect, an embodiment of this application provides a readable storage medium, where the readable storage medium stores a program or instructions, and when the program or instructions are executed by a processor, the steps of the foregoing method are implemented.

According to a fifth aspect, an embodiment of this application provides a chip, where the chip includes a processor and a communications interface, the communications interface is coupled to the processor, and the processor is configured to run a program or instructions so as to implement the method according to the first aspect.

According to a sixth aspect, an embodiment of this application provides a computer program product, where the computer program product is stored in a storage medium, and the computer program product is executed by at least one processor so as to implement the steps of the method according to the first aspect.

According to a seventh aspect, an embodiment of this application provides a communications device configured to perform the steps of the method according to the first aspect.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and persons of ordinary skill in the art may derive other drawings from these accompanying drawings without creative efforts.

DESCRIPTION OF EMBODIMENTS

Figures 1, 2:
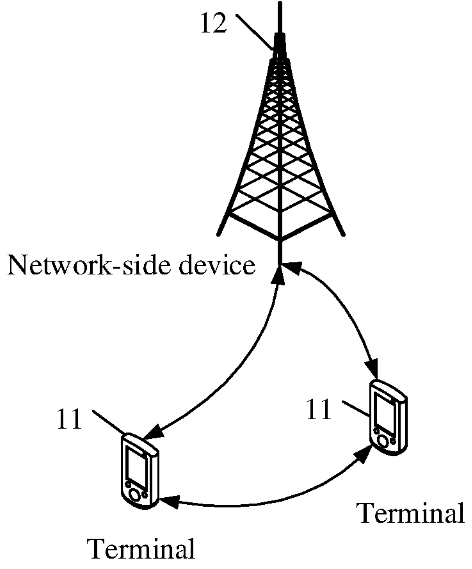
FIG. 1 shows a schematic diagram of a wireless communications system.
FIG. 2 shows a schematic flowchart of a working method for communications device according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that the terms used in this way is interchangeable in appropriate circumstances so that the embodiments of this application can be implemented in other orders than the order illustrated or described herein. In addition, "and/or" in the specification and claims represents at least one of connected objects, and the character "/" generally indicates that the associated objects have an "or" relationship.

The technologies described herein are not limited to long term evolution (LTE)/LTE-Advanced (LTE-A) systems, but may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. The CDMA system can implement radio technologies such as CDMA2000, and universal terrestrial radio access (UTRA). UTRA includes wideband CDMA (WCDMA) and other CDMA variants. The TDMA system can implement radio technologies such as global system for mobile communications (GSM). The OFDMA system can implement radio technologies such as ultramobile broadband (UMB), Evolution-UTRA (E-UTRA), IEEE 802.11 (Wi-Fi), IEEE 802.16 (WiMAX), IEEE 802.20, and Flash-OFDM. UTRA and E-UTRA are both part of the universal mobile telecommunications system (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). Techniques described in this specification may be used in the aforementioned systems and radio technologies, and can also be used in other systems and radio technologies. In the following descriptions, an NR system is described for an illustration purpose, and NR terms are used in most of the following descriptions, although these techniques may also be applied to other applications than the NR system application.

Examples provided in the following description are not intended to limit the scope, applicability, or configuration described in the claims. Functions and arrangements of discussed elements may be changed without departing from the spirit and scope of this disclosure. Various examples may be omitted or replaced where appropriate, or various procedures or components may be added. For example, the described method may be performed in an order different from the order described, and steps may be added, omitted, or combined. In addition, features described with reference to some examples may be combined in other examples.

FIG. 1 shows a block diagram of a wireless communications system to which embodiments of this application may be applied. The wireless communications system includes a terminal 11 and a network-side device 12. The terminal 11 may also be referred to as a terminal device or user equipment (UE). The terminal 11 may be a terminal side device such as a mobile phone, a tablet personal computer, a laptop computer, a personal digital assistant (PDA), a mobile Internet device (MID), a wearable device, or an in-vehicle device. It should be noted that the terminal 11 is not limited to any specific type in the embodiments of this application. The network-side device 12 may be a base station or a core network. The base station may be a 5th-generation mobile communication (5G) base station or base stations of later releases (for example, NR node (gNB), 5G NR NB, and the like), or base stations in other communications systems (for example, evolved Node B (eNB), wireless local area network (WLAN) access point, or other access points), or a location server (for example, enhanced serving mobile location center (E-SMLC) or location manager function (LMF). The base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a WLAN access point, a wireless fidelity (Wi-Fi) node, or other appropriate terms in the art. As long as the same technical effect is achieved, the base station is not limited to any specific technical terms. It should be noted that only the base station in the NR system is used as an example in the embodiments of this application, but the specific type of the base station is not limited in the embodiments of this application. The description of the embodiments of this application can refer to transmission and reception between a terminal and a base station, or transmission and reception between two terminals, terminal 1 and terminal 2, or other non-cellular communications system transmission/reception nodes, such as receiving and transmitting apparatuses of a sensor.

A mobile phone and a network communicate with each other through a radio channel and exchange a large amount of information with each other, so the two parties need a control mechanism to exchange configuration information and reach agreement, and such control mechanism is radio resource control (RRC). In order to make the terminal maintain a relatively fixed communication state, different RRC states are introduced in relevant communications systems.

For example, three RRC states are defined in new radio (NR): IDLE, inactive state, and CONNECTED.

Only two RRC states are defined in long term evolution (LTE), RRC IDLE and RRC CONNECTED. NR has introduced a new state, RRC INACTIVE.

Transitions between the foregoing states are supported.

The foregoing design of IDLE state still requires the terminal to periodically turn on a transceiver and a signal processing module of a corresponding MODEM to process the received signal where applicable. Such RF and MODEM modules cannot be truly turned off completely, making it difficult to reduce power consumption of communication in the IDLE state.

To reduce receiving activities in RRC IDLE state, so that the RF and MODEM modules are truly turned off to significantly reduce power consumption of communication reception, a near "zero" power receiver in the receiving module of the terminal can be introduced. Such near "zero" power receiver does not require complex signal detection (such as amplification, filtering, and quantization) of the RF module or signal processing of the MODEM, but only needs passive matching filtering and signal processing with less power consumption.

On the base station side, wake-up signal (WUS) is triggered on demand to activate the near "zero" power receiver to be notified of the activation, thus triggering a series of processes inside the terminal, such as turning on modules such as the RF transceiver and baseband processing module.

Such wake-up signals are typically some simple on-off keying signals (on-off keying), so that the receiver can be notified of the wake-up through a simple energy detection, and a subsequent possible sequence detection and identification process.

An embodiment of this application provides a working method for communications device, performed by a first communications device, as shown in FIG. 2, including:

Step 101: Transition from non-sleep state to sleep state in a case that at least one of the following is satisfied:

a sleep state transition command from a second communications device has been received; and it has been determined that the first communications device meets a preset sleep state transition condition.

In this embodiment of this application, the first communications device transitions from non-sleep state to sleep state when a preset condition is satisfied. In the sleep state, the first communications device monitors for wake-up signal without performing other physical layer procedures, thereby reducing power consumption of the communications device. When it is necessary to exit the sleep state, the wake-up signal can indicate the first communications device to transition to non-sleep state to ensure communication quality of the first communications device.

In some embodiments, in the sleep state, the first communications device at least monitors for wake-up signal, where the sleep state is a state different from RRC IDLE, INACTIVE or CONNECTED, and optionally, in the sleep state, the MODEM module is turned off to save power; and in the non-sleep state, the first communications device does not monitor for wake-up signal and performs physical layer procedures under radio resource control RRC idle state IDLE, inactive state INACTIVE, or connected state CONNECTED.

In this embodiment, in the sleep state, the first communications device can monitor for only the wake-up signal, thus reducing the power consumption of the communications device. In the non-sleep state, the first communications device performs physical layer procedures under other states.

For each state, the physical layer procedures performed are as follows:

1. RRC_IDLE (Idle Mode):

UE performs public land mobile network (PLMN) selection;

UE receives broadcast of system information;

cell re-selection mobility;

paging for mobile terminated data is initiated by 5th Generation Mobile Communication Technology Core Network (5G) core network (5GC);

paging for mobile terminated data area is managed by 5GC; and discontinuous reception (DRX) for core network (CN) paging configured by non access stratum (NAS).

2. RRC_INACTIVE (Inactive Mode):

PLMN selection;

broadcast of system information;

cell re-selection mobility;

paging initiated by NG-RAN (RAN paging);

radio access network (RAN) based notification area (RNA) is managed by NG-RAN;

DRX for RAN paging configured by NG-RAN;

5GC-NG-RAN connection (including control plane and/or user plane) is established for UE;

the UE access stratum (AS) context is stored in NG-RAN and UE; and

NG-RAN knows the RNA to which the UE belongs.

3. RRC_CONNECTED (Connected Mode):

5GC-NG-RAN connection (including control plane and/or user plane) is established for UE;

the UE AS context is stored in NG-RAN and UE;

NG-RAN knows the cell to which the UE belongs;

transfer of unicast data to UE; and network controlled mobility including measurements.

In some embodiments, the sleep state transition condition includes at least one of the following:

received signal quality of the first communications device is higher than a first threshold, or received signal quality of the first communications device is lower than a second threshold;

the first communications device undergoes no cell reselection within a first preset time period;

fluctuation range of received signal quality of the first communications device within a second preset time period is less than a third threshold;

the first communications device receives no paging message or system message within a third preset time period; and continuous camping time of the first communications device in at least one other state than sleep state is longer than a first preset duration.

The first threshold, second threshold, first preset time period, second preset time period, third threshold, third preset time period, and first preset duration may be preconfigured, network side configured, or protocol defined.

The received signal quality can be measured by reference signal received power (RSRP), reference signal received quality (RSRQ), received signal strength indication (RSSI), pathloss, or signal to interference plus noise ratio (SINR), but is not limited to these parameters.

The at least one other state than sleep state may be IDLE state or INACTIVE state.

In some embodiments, the method further includes:

reporting assistance information to the second communications device, where the assistance information is used for the second communications device to determine whether to transmit a sleep state transition command to the first communications device, and the assistance information includes at least one of the following:

signal strength or signal quality of the first communications device; and a mobility condition of the first communications device.

After receiving the assistance information, the second communications device can determine, based on the assistance information, whether to indicate the first communications device to enter sleep state, where the assistance information is related to the communication quality of the first communications device, so that the first communications device enters sleep state without communication quality affected, thus ensuring the communication quality of the first communications device and reducing the power consumption of the first communications device.

In some embodiments, before or after the transitioning from non-sleep state to sleep state, the method further includes:

transmitting first indication information to the second communications device to indicate that the first communications device enters sleep state.

In this embodiment, the first communications device may transmit the first indication information to the second communications device before transitioning from non-sleep state to sleep state, where the first indication information may serve as a request that the first communications device expects to transition from non-sleep state to sleep state. Alternatively, the first communications device may transmit the first indication information to the second communications device after transitioning from non-sleep state to sleep state, where the first indication information may serve as a notification that the first communications device has transitioned from non-sleep state to sleep state.

Optionally, the first communications device transitions from non-sleep state to sleep state in a case that a preset sleep state transition condition is satisfied. Since such manner is for the first communications device to transition states autonomously, the first communications device may transmit the first indication information to the second communications device before or after transitioning from non-sleep state to sleep state. Specifically, the first communications device may transmit the first indication information to the second communications device before transitioning from non-sleep state to sleep state; or, the first communications device may transmit the first indication information to the second communications device after transitioning from non-sleep state to sleep state.

In this way, after the first communications device enters sleep state, the first communications device can notify the second communications device that it has entered sleep state, so that the second communications device is notified of the state of the first communications device in time, avoiding that the second communications device transmits unnecessary signaling to the first communications device.

In some embodiments, the first indication information is carried on any one of the following:

a random access channel (RACH);

a sounding reference signal SRS);

a reference signal (SR);

physical uplink shared channel (PUSCH);

a predefined physical channel; and a predefined physical signal.

In some embodiments, the method further includes:

receiving second indication information from the second communications device to indicate denial of entering sleep state.

In this embodiment, the second communications device can deny the first communications device from transitioning from non-sleep state to sleep state. Optionally, the first communications device may transmit the first indication information to the second communications device before transitioning from non-sleep state to sleep state, where the first indication information serves as a request to transition from non-sleep state to sleep state. In this case, the second communications device may transmit the second indication information to the first communications device to indicate denying the first communications device of entering sleep state. It should be noted that the second communications device may further transmit a sleep state transition command to indicate approval of the first communications device entering sleep state.

In this way, under the condition that the second communications device thinks that the first communications device cannot enter sleep state, the second communications device can transmit the second indication information to indicate the first communications device not to enter sleep state, thus ensuring the communication quality of the first communications device.

In some embodiments, the method further includes:

receiving a third message from the second communications device; and acquiring configuration information of the wake-up signal based on the third message.

In this way, the first communications device can obtain the configuration information of the wake-up signal via the third message, and monitor for wake-up signal according to the configuration information of the wake-up signal.

In some embodiments, the third message carries the configuration information of the wake-up signal, and the configuration information includes at least one of the following:

sequence information of the wake-up signal, such as base sequence and scrambling code information;

frequency domain information of the wake-up signal;

parameter configuration for triggering state transition, such as timer configuration; and configuration of beacon signal.

The third message may be dedicated signaling or common signaling. The third message may include configuration information of at least one wake-up signal.

In some embodiments, the third message carries the configuration information of the wake-up signal or the third message carries information for calculating the configuration information of the wake-up signal, and the configuration information of the wake-up signal includes at least one of the following:

time domain resources for the wake-up signal including receiving periodicity and offset in time;

frequency domain resources for the wake-up signal including density in frequency domain; and code domain resources for the wake-up signal.

The third message may be dedicated signaling or common signaling. The third message may include configuration information of at least one wake-up signal.

The third message may directly carry the configuration information of the wake-up signal, or may carry the information for calculating the configuration information of the wake-up signal. In a case that the third message carries the information for calculating the configuration information of the wake-up signal, the first communications device can calculate resource information for receiving the wake-up signal based on the "information for calculating the configuration information of the wake-up signal" in combination with information such as identifier of the first communications device, where the resource information includes time positions, frequency domain positions, code resources, and the like.

In some embodiments, after entry to sleep state, the method further includes:

according to the configuration information of the wake-up signal, periodically monitoring for wake-up signal or always monitoring for wake-up signal.

When monitoring for wake-up signal, the first communications device can monitor for wake-up signal according to a preset periodicity or always monitor for wake-up signal. The preset periodicity can be network side configured, pre-configured, or protocol defined, and monitoring for wake-up signal according to the preset periodicity can further reduce the power consumption of the first communications device. In some specific examples, the first communications device may periodically monitor for wake-up signal on a target time-frequency resource.

In some embodiments, after entry to sleep state, the method further includes:

turning off a main receiver, where the main receiver is configured to receive downlink information in non-sleep state; and turning on a dedicated receiver, where the dedicated receiver is configured to monitor for wake-up signal in sleep state.

In this way, after entry to sleep state, the first communications device only turns on the dedicated receiver, thus reducing the power consumption of the first communications device.

In some embodiments, the method further includes:

performing downlink synchronization via the dedicated receiver, where signal for downlink synchronization is different from wake-up WUS signal.

In this way, after entry to sleep state, the first communications device can still use the dedicated receiver for downlink synchronization, thus ensuring the communication quality of the first communications device.

In some embodiments, the method further includes:

performing at least one of radio resource measurement and downlink synchronization based on the wake-up signal.

In this way, the first communications device can further use the wake-up signal for radio resource measurement or downlink synchronization, which can improve utilization of the wake-up signal, and signaling overheads can be reduced as no additional signals are needed for radio resource measurement or downlink synchronization. If the downlink synchronization is performed via the wake-up signal, the network side transmits wake-up signals at fixed time intervals. In this case, the wake-up signal can be used only for downlink synchronization without waking up the first communications device.

In some embodiments, the information carried on the wake-up signal includes at least one of the following:

wake-up indication information indicating the first communications device to wake up;

sleep indication information indicating the first communications device to sleep; and synchronization information.

In some embodiments, in a case that the wake-up signal indicates the first communications device to wake up, the method further includes:

entering non-sleep state.

In this embodiment of this application, the first communications device may be a mobile terminal, and the second communications device may be a network-side device, a mobile terminal, or a network node; or the first communications device is a receiving node of a communications system, and the second communications device is a transmitting node of a communications device, for example, the first communications device is a receiving apparatus of a sensor, and the second communications device is a transmitting apparatus of the sensor, and the like.

It should be noted that the working method for communications device provided in this embodiment of this application may be executed by a working apparatus for communications device, or a module in the working apparatus for communications device for loading of the working method for communications device. In embodiments of this application, the working method for communications device provided in embodiments of this application is described by taking the working method for communications device being loaded by a working apparatus for communications device as an example.

Figure 3:
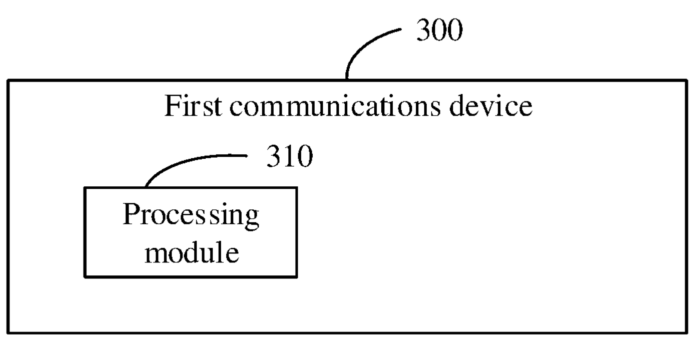
FIG. 3 shows a schematic diagram of a structure of a working apparatus for communications device according to an embodiment of this application.

An embodiment of this application provides a working apparatus for communications device, applied to a first communications device 300, as shown in FIG. 3, where the device includes:

a processing module 310 configured to transition from non-sleep state to sleep state in a case that at least one of the following is satisfied:

a sleep state transition command from a second communications device has been received; and it has been determined that the first communications device meets a preset sleep state transition condition.

In this embodiment of this application, the first communications device transitions from non-sleep state to sleep state when a preset condition is satisfied. In the sleep state, the first communications device monitor for wake-up signal without performing other physical layer procedures, thereby reducing power consumption of the communications device. When it is necessary to exit the sleep state, the wake-up signal can indicate the first communications device to transition to non-sleep state to ensure communication quality of the first communications device.

In some embodiments, in the sleep state, the first communications device at least monitors for wake-up signal; and in the non-sleep state, the first communications device does not monitor for wake-up signal and performs physical layer procedures under radio resource control RRC idle state IDLE, inactive state INACTIVE, or connected state CONNECTED.

In this embodiment, in the sleep state, the first communications device can monitor for only wake-up signal, thus reducing the power consumption of the communications device. In the non-sleep state, the first communications device performs physical layer procedures under other states.

For each state, the physical layer procedures performed are as follows:

1. RRC_IDLE (Idle Mode):

UE performs public land mobile network (PLMN) selection;

UE receives broadcast of system information;

cell re-selection mobility;

paging for mobile terminated data is initiated by 5G core network (5GC);

paging for mobile terminated data area is managed by 5GC; and discontinuous reception (DRX) for core network (CN) paging configured by non access stratum (NAS).

2. RRC_INACTIVE (Inactive Mode):

PLMN selection;

broadcast of system information;

cell re-selection mobility;

paging initiated by NG-RAN (RAN paging);

radio access network (RAN) based notification area (RNA) is managed by NG-RAN;

DRX for RAN paging configured by NG-RAN;

5GC-NG-RAN connection (including control plane and/or user plane) is established for UE;

the UE access stratum (AS) context is stored in NG-RAN and UE; and

NG-RAN knows the RNA to which the UE belongs.

3. RRC_CONNECTED (Connected Mode):

5GC-NG-RAN connection (including control plane and/or user plane) is established for UE;

the UE AS context is stored in NG-RAN and UE;

NG-RAN knows the cell to which the UE belongs;

transfer of unicast data to UE; and network controlled mobility including measurements.

In some embodiments, the sleep state transition condition includes at least one of the following:

received signal quality of the first communications device is higher than a first threshold, or received signal quality of the first communications device is lower than a second threshold;

the first communications device undergoes no cell re-selection within a first preset time period;

fluctuation range of received signal quality of the first communications device within a second preset time period is less than a third threshold;

the first communications device receives no paging message or system message within a third preset time period; and continuous camping time of the first communications device in at least one other state than sleep state is longer than a first preset duration.

The first threshold, second threshold, first preset time period, second preset time period, third threshold, third preset time period, and first preset duration may be pre-configured, network side configured, or protocol defined.

The received signal quality can be measured by reference signal received power (RSRP), reference signal received quality (RSRQ), received signal strength indication (RSSI), pathloss, or signal to interference plus noise ratio (SINR), but is not limited to these parameters.

The at least one other state than sleep state may be IDLE state or INACTIVE state.

In some embodiments, the apparatus further includes:

a reporting module configured to report assistance information to the second communications device, where the assistance information is used for the second communications device to determine whether to transmit a sleep state transition command to the first communications device, and the assistance information includes at least one of the following:

signal strength or signal quality of the first communications device; and a mobility condition of the first communications device.

After receiving the assistance information, the second communications device can determine, based on the assistance information, whether to indicate the first communications device to enter sleep state, where the assistance information is related to the communication quality of the first communications device, so that the first communications device enters sleep state without communication quality affected, thus ensuring the communication quality of the first communications device and reducing the power consumption of the first communications device.

In some embodiments, the apparatus further includes:

a transmitting module configured to transmit first indication information to the second communications device to indicate that the first communications device enters sleep state.

After receiving the assistance information, the second communications device can determine, based on the assistance information, whether to indicate the first communications device to enter sleep state, where the assistance information is related to the communication quality of the first communications device, so that the first communications device enters sleep state without communication quality affected, thus ensuring the communication quality of the first communications device and reducing the power consumption of the first communications device.

In some embodiments, the first indication information is carried on any one of the following:

a random access channel RACH;

a sounding reference signal SRS;

a reference signal SR;

a physical uplink shared channel PUSCH;

a predefined physical channel; and a predefined physical signal.

In some embodiments, the apparatus further includes:

a receiving module configured to receive second indication information from the second communications device to indicate denial of entering sleep state.

In this way, under the condition that the second communications device thinks that the first communications device cannot enter sleep state, the second communications device can transmit the second indication information to indicate the first communications device not to enter sleep state, thus ensuring the communication quality of the first communications device.

In some embodiments, the apparatus further includes:

a receiving module configured to receive a third message from the second communications device and acquire configuration information of the wake-up signal based on the third message.

In this way, the first communications device can obtain the configuration information of the wake-up signal via the third message, and monitor for wake-up signal according to the configuration information of the wake-up signal.

In some embodiments, the third message carries the configuration information of the wake-up signal, and the configuration information includes at least one of the following:

sequence information of the wake-up signal;

frequency domain information of the wake-up signal;

parameter configuration for triggering state transition; and configuration of beacon signal.

The third message may be dedicated signaling or common signaling. The third message may include configuration information of at least one wake-up signal.

In some embodiments, the third message carries the configuration information of the wake-up signal or the third message carries information for calculating the configuration information of the wake-up signal, and the configuration information of the wake-up signal includes at least one of the following:

time domain resources for the wake-up signal including receiving periodicity and offset in time;

frequency domain resources for the wake-up signal including density in frequency domain; and code domain resources for the wake-up signal.

The third message may be dedicated signaling or common signaling. The third message may include configuration information of at least one wake-up signal.

The third message may directly carry the configuration information of the wake-up signal, or may carry the information for calculating the configuration information of the wake-up signal. In a case that the third message carries the information for calculating the configuration information of the wake-up signal, the first communications device can calculate resource information for receiving the wake-up signal based on the "information for calculating the configuration information of the wake-up signal" in combination with information such as identifier of the first communications device, where the resource information includes time positions, frequency domain positions, code resources, and the like.

In some embodiments, the apparatus further includes:

a monitoring module configured to, according to the configuration information of the wake-up signal, periodically monitor for wake-up signal or always monitor for wake-up signal.

When monitoring for wake-up signal, the first communications device can monitor for wake-up signal according to a preset periodicity or always monitor for wake-up signal. The preset periodicity can be network side configured, pre-configured, or protocol defined, and monitoring for wake-up signal according to the preset periodicity can further reduce the power consumption of the first communications device. In some specific examples, the first communications device may periodically monitor for wake-up signal on a target time-frequency resource.

In some embodiments, the processing module is further configured to turn off a main receiver, where the main receiver is configured to receive downlink information in non-sleep state; and turn on a dedicated receiver, where the dedicated receiver is configured to monitor for wake-up signal in sleep state.

In this way, after entry to sleep state, the first communications device only turns on the dedicated receiver, thus reducing the power consumption of the first communications device.

In some embodiments, the apparatus further includes:

a synchronization module configured to perform downlink synchronization via the dedicated receiver, where signal for downlink synchronization is different from wake-up WUS signal.

In this way, after entry to sleep state, the first communications device can still use the dedicated receiver for downlink synchronization, thus ensuring the communication quality of the first communications device.

In some embodiments, the apparatus further includes:

an execution module configured to perform at least one of radio resource measurement and downlink synchronization via the wake-up signal.

In this way, the first communications device can further use the wake-up signal for radio resource measurement or downlink synchronization, which can improve utilization of the wake-up signal, and signaling overheads can be reduced as no additional signals are needed for radio resource measurement or downlink synchronization. If the downlink synchronization is performed via the wake-up signal, the network side transmits wake-up signals at fixed time intervals. In this case, the wake-up signal can be used only for downlink synchronization without waking up the first communications device.

In some embodiments, the information carried on the wake-up signal includes at least one of the following:

wake-up indication information indicating the first communications device to wake up;

sleep indication information indicating the first communications device to sleep; and synchronization information.

In some embodiments, in a case that the wake-up signal indicates the first communications device to wake up, the processing module is further configured to enter non-sleep state.

In this embodiment of this application, the first communications device may be a mobile terminal, and the second communications device may be a network-side device, a mobile terminal, or a network node; or the first communications device is a receiving node of a communications system, and the second communications device is a transmitting node of a communications device, for example, the first communications device is a receiving apparatus of a sensor, and the second communications device is a transmitting apparatus of the sensor, and the like.

The working apparatus for communications device in this embodiment of this application may be an apparatus or a component, integrated circuit, or chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a network attached storage (NAS), a personal computer (PC), a television (TV), a teller machine, a self-service machine, or the like. This is not specifically limited in the embodiments of this application.

The working apparatus for communications device in this embodiment of this application may be an apparatus with an operating system. The operating system may be an Android operating system, iOS operating system, or other possible operating system. This is not specifically limited in the embodiments of this application.

Optionally, an embodiment of this application further provides a communications device, including a processor, a memory, and a program or instructions stored in the memory and capable of running on the processor. When the program or instructions are executed by the processor, the processes of the embodiments of the foregoing working method for communications device are implemented, with the same technical effect be achieved. To avoid repetition, details are not described herein again.

It should be noted that the communications device in this embodiment of this application includes the above-mentioned mobile electronic device and non-mobile electronic device.

Figure 4:
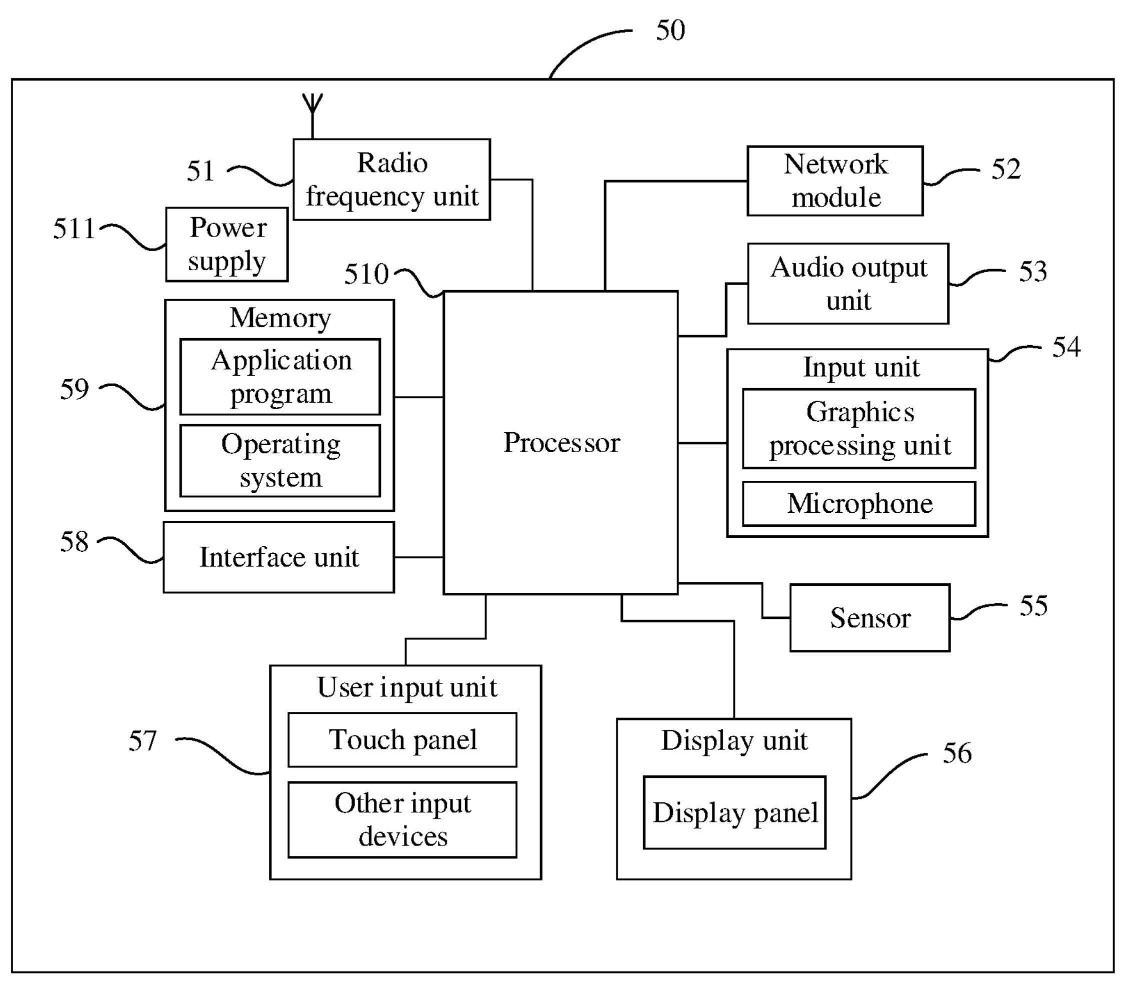
FIG. 4 shows a schematic diagram of a composition of a terminal according to an embodiment of this application.

The communications device in this embodiment may be a terminal. FIG. 4 is a schematic diagram of a hardware structure of a terminal for implementing the embodiments of this application. The terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. Persons skilled in the art may understand that the structure of the terminal shown in FIG. 4 does not constitute a limitation on the terminal. The terminal may include more or fewer components than shown in the figure, or combine some of the components, or have different component arrangements. In this embodiment of this application, the terminal includes but is not limited to a mobile phone, a tablet computer, a notebook computer, a palmtop computer, an in-vehicle terminal, a wearable device, a pedometer, or the like.

It should be understood that, in this embodiment of this application, the radio frequency unit 51 may be configured to transmit and receive signals in an information transmitting/receiving or call process. Specifically, the radio frequency unit 51 receives downlink data from a base station and transmits the downlink data to the processor 510 for processing; and transmits uplink data to the base station. Typically, the radio frequency unit 51 includes but is not limited to an antenna, at least one amplifier, a transceiver, a coupler, a low noise amplifier, and a duplexer. In addition, the radio frequency unit 51 may further communicate with a network and other devices via a wireless communications system.

The memory 59 may be configured to store software programs and various data. The memory 59 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 59 may include a high-speed random access memory, or may further include a non-volatile memory, for example, at least one magnetic disk storage device, a flash memory device, or other volatile solid-state storage devices.

The processor 510 is a control center of the terminal, and is connected to the components of the terminal via various interfaces and lines. By running or executing software programs and/or modules stored in the memory 59 and calling data stored in the memory 59, the processor 510 executes various functions of the terminal and processes data so as to perform overall monitoring on the terminal. The processor 510 may include one or at least two processing units. Preferably, the processor 510 may integrate an application processor and a modem processor. The application processor mainly processes an operating system, a user interface, an application program, and the like. The modem processor mainly processes wireless communication. It can be understood that the modem processor may alternatively be not integrated in the processor 510.

The terminal 50 further includes the power supply 511 (for example, battery) supplying power to the components. Preferably, the power supply 511 may be logically connected to the processor 510 via a power management system. In this way, functions such as charge management, discharge management, and power consumption management are implemented via the power management system.

In addition, the terminal 50 includes some functional modules that are not shown. Details are not described herein.

In some embodiments, the processor 510 is configured to transition from non-sleep state to sleep state in a case that at least one of the following is satisfied:

a sleep state transition command from a second communications device has been received; and it has been determined that the first communications device meets a preset sleep state transition condition.

In some embodiments, in the sleep state, the first communications device at least monitors for wake-up signal; and in the non-sleep state, the first communications device does not monitor for wake-up signal and performs physical layer procedures under radio resource control RRC idle state IDLE, inactive state INACTIVE, or connected state CONNECTED.

In some embodiments, the sleep state transition condition includes at least one of the following:

received signal quality of the first communications device is higher than a first threshold, or received signal quality of the first communications device is lower than a second threshold;

the first communications device undergoes no cell reselection within a first preset time period;

fluctuation range of received signal quality of the first communications device within a second preset time period is less than a third threshold;

the first communications device receives no paging message or system message within a third preset time period; and continuous camping time of the first communications device in at least one other state than sleep state is longer than a first preset duration.

In some embodiments, the processor 510 is further configured to report assistance information to the second communications device, where the assistance information is used for the second communications device to determine whether to transmit a sleep state transition command to the first communications device, and the assistance information includes at least one of the following:

signal strength or signal quality of the first communications device; and a mobility condition of the first communications device.

In some embodiments, before or after transitioning from non-sleep state to sleep state, the processor 510 is further configured to transmit first indication information to the second communications device to indicate that the first communications device enters sleep state.

In some embodiments, the first indication information is carried on any one of the following:

a random access channel RACH;

a sounding reference signal SRS;

a reference signal SR;

a physical uplink shared channel PUSCH;

a predefined physical channel; and a predefined physical signal.

In some embodiments, the processor 510 is further configured to receive second indication information from the second communications device to indicate denial of entering sleep state.

In some embodiments, the processor 510 is further configured to receive a third message from the second communications device and acquire configuration information of the wake-up signal based on the third message.

In some embodiments, the third message carries the configuration information of the wake-up signal, and the configuration information includes at least one of the following:

sequence information of the wake-up signal;

frequency domain information of the wake-up signal;

parameter configuration for triggering state transition; and configuration of beacon signal.

In some embodiments, the third message carries the configuration information of the wake-up signal or the third message carries information for calculating the configuration information of the wake-up signal, and the configuration information of the wake-up signal includes at least one of the following:

time domain resources for the wake-up signal;

frequency domain resources for the wake-up signal; and code domain resources for the wake-up signal.

In some embodiments, after entry to sleep state, the processor 510 is further configured to, according to the configuration information of the wake-up signal, periodically monitor for wake-up signal or always monitor for wake-up signal.

In some embodiments, after entry to sleep state, the processor 510 is further configured to turn off a main receiver, where the main receiver is configured to receive downlink information in non-sleep state; and turn on a dedicated receiver, where the dedicated receiver is configured to monitor for wake-up signal in sleep state.

In some embodiments, processor 510 is further configured to perform downlink synchronization via the dedicated receiver, where signal for downlink synchronization is different from wake-up WUS signal.

In some embodiments, the processor 510 is further configured to perform at least one of radio resource measurement and downlink synchronization via the wake-up signal.

In some embodiments, the information carried on the wake-up signal includes at least one of the following:

wake-up indication information indicating the first communications device to wake up;

sleep indication information indicating the first communications device to sleep; and synchronization information.

In some embodiments, in a case that the wake-up signal indicates the first communications device to wake up, the processor 510 is further configured to enter non-sleep state.

In this embodiment of this application, the first communications device is a mobile terminal, and the second communications device is a network-side device, a mobile terminal, or a network node; or the first communications device is a receiving node of a communications system, and the second communications device is a transmitting node of a communications device.

An embodiment of this application further provides a readable storage medium, where the readable storage medium stores a program or instructions, and when the program or instructions are executed by a processor, the processes of the embodiments of the foregoing working method for communications device are implemented, with the same technical effect achieved. To avoid repetition, details are not described herein again.

The processor is the processor in the communications device in the foregoing embodiment. The readable storage medium includes a computer-readable storage medium, such as a computer read-only memory (ROM), a random access memory (RAM), a magnetic disk, or an optical disc.

An embodiment of this application further provides a chip, where the chip includes a processor and a communications interface, the communications interface is coupled to the processor, and the processor is configured to run a program or instructions to implement processes of the embodiments of the foregoing working method for communications device with the same technical effect achieved. To avoid repetition, details are not described herein again.

It should be understood that the chip mentioned in this embodiment of this application may also be referred to as a system-level chip, a system chip, a chip system, a system-on-chip, or the like.

An embodiment of this application provides a computer program product, where the program product is stored in a non-volatile storage medium, and the program product is executed by at least one processor to implement the processes of the foregoing method embodiments, with the same technical effects achieved. To avoid repetition, details are not described herein again.

An embodiment of this application provides a communications device configured to execute the processes of the foregoing method embodiments with the same technical effect achieved. To avoid repetition, details are not described herein again.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, a network device, or the like) to perform the method described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A working method for communications device, performed by a first communications device, wherein the method comprises:

transitioning from non-sleep state to sleep state in a case that at least one of the following is satisfied:

a sleep state transition command from a second communications device has been received; and it has been determined that the first communications device meets a preset sleep state transition condition; wherein the sleep state transition condition comprises at least one of the following:

received signal quality of the first communications device is higher than a first threshold, or received signal quality of the first communications device is lower than a second threshold;

the first communications device undergoes no cell reselection within a first preset time period;

fluctuation range of received signal quality of the first communications device within a second preset time period is less than a third threshold;

the first communications device receives no paging message or system message within a third preset time period; and continuous camping time of the first communications device in at least one other state than sleep state is longer than a first preset duration;

wherein before the transitioning from non-sleep state to sleep state, the method further comprises:

transmitting first indication information to the second communications device to indicate that the first communications device enters sleep state;

wherein the first indication information is carried on any one of the following: a random access channel (RACH); a sounding reference signal (SRS); a reference signal (SR); a physical uplink shared channel (PUSCH); a predefined physical channel; or a predefined physical signal.

2. The working method for communications device according to claim 1, wherein in the sleep state, the first communications device at least monitors for wake-up signal; and in the non-sleep state, the first communications device does not monitor for wake-up signal and performs physical layer procedures under radio resource control (RRC) idle state (IDLE), inactive state (INACTIVE), or connected state (CONNECTED);

wherein information carried on the wake-up signal comprises at least one of the following:

wake-up indication information indicating the first communications device to wake up;

sleep indication information indicating the first communications device to sleep; and synchronization information.

3. The working method for communications device according to claim 2, wherein the method further comprises:

receiving a third message from the second communications device; and acquiring configuration information of the wake-up signal based on the third message;

wherein the third message carries the configuration information of the wake-up signal, and the configuration information comprises at least one of the following:

sequence information of the wake-up signal;

frequency domain information of the wake-up signal;

parameter configuration for triggering state transition; and configuration of beacon (Beacon) signal;

or, wherein the third message carries the configuration information of the wake-up signal or the third message carries information for calculating the configuration information of the wake-up signal, and the configuration information of the wake-up signal comprises at least one of the following:

time domain resources for the wake-up signal;

frequency domain resources for the wake-up signal; and code domain resources for the wake-up signal.

4. The working method for communications device according to claim 3, wherein after entry to sleep state, the method further comprises:

according to the configuration information of the wake-up signal, periodically monitoring for wake-up signal or always monitoring for wake-up signal.

5. The working method for communications device according to claim 2, wherein after entry to sleep state, the method further comprises:

turning off a main receiver, wherein the main receiver is configured to receive downlink information in non-sleep state; and turning on a dedicated receiver, wherein the dedicated receiver is configured to monitor for wake-up signal in sleep state.

6. The working method for communications device according to claim 5, wherein the method further comprises:

performing downlink synchronization via the dedicated receiver, wherein signal for downlink synchronization is different from wake-up (WUS) signal.

7. The working method for communications device according to claim 5, wherein the method further comprises:

performing at least one of radio resource measurement and downlink synchronization based on the wake-up signal.

8. The working method for communications device according to claim 2, wherein in a case that the wake-up signal indicates the first communications device to wake up, the method further comprises:

entering non-sleep state.

9. The working method for communications device according to claim 1, wherein the method further comprises:

reporting assistance information to the second communications device, wherein the assistance information is used for the second communications device to determine whether to transmit a sleep state transition command to the first communications device, and the assistance information comprises at least one of the following:

signal strength or signal quality of the first communications device; and a mobility condition of the first communications device.

10. The working method for communications device according to claim 1, wherein the method further comprises:

receiving second indication information from the second communications device to indicate denial of entering sleep state.

11. The working method for communications device according to claim 1, wherein the first communications device is a mobile terminal, and the second communications device is a network-side device, a mobile terminal, or a network node; or the first communications device is a receiving node of a communications system, and the second communications device is a transmitting node of a communications device.

12. A communications device comprising a processor, a memory, and a program or instructions stored in the memory and capable of running on the processor, wherein the program or instructions are executed by the processor to perform:

transitioning from non-sleep state to sleep state in a case that at least one of the following is satisfied:

a sleep state transition command from a second communications device has been received; and it has been determined that the first communications device meets a preset sleep state transition condition;

wherein the sleep state transition condition comprises at least one of the following:

received signal quality of the first communications device is higher than a first threshold, or received signal quality of the first communications device is lower than a second threshold;

the first communications device undergoes no cell reselection within a first preset time period;

fluctuation range of received signal quality of the first communications device within a second preset time period is less than a third threshold;

the first communications device receives no paging message or system message within a third preset time period; and continuous camping time of the first communications device in at least one other state than sleep state is longer than a first preset duration;

wherein before the transitioning from non-sleep state to sleep state, the program or instructions are executed by the processor to perform:

transmitting first indication information to the second communications device to indicate that the first communications device enters sleep state;

wherein the first indication information is carried on any one of the following: a random access channel (RACH); a sounding reference signal (SRS); a reference signal (SR); a physical uplink shared channel (PUSCH); a predefined physical channel; or a predefined physical signal.

13. The communications device according to claim 12, wherein in the sleep state, the first communications device at least monitors for wake-up signal; and in the non-sleep state, the first communications device does not monitor for wake-up signal and performs physical layer procedures under radio resource control (RRC) idle state (IDLE), inactive state (INACTIVE), or connected state (CONNECTED);

wherein information carried on the wake-up signal comprises at least one of the following:

wake-up indication information indicating the first communications device to wake up;

sleep indication information indicating the first communications device to sleep; and synchronization information.

14. The communications device according to claim 13, wherein the program or instructions are executed by the processor to perform:

receiving a third message from the second communications device; and acquiring configuration information of the wake-up signal based on the third message;

wherein the third message carries the configuration information of the wake-up signal, and the configuration information comprises at least one of the following:

sequence information of the wake-up signal;

frequency domain information of the wake-up signal;

parameter configuration for triggering state transition; and configuration of beacon (Beacon) signal;

or, wherein the third message carries the configuration information of the wake-up signal or the third message carries information for calculating the configuration information of the wake-up signal, and the configuration information of the wake-up signal comprises at least one of the following:

time domain resources for the wake-up signal;

frequency domain resources for the wake-up signal; and code domain resources for the wake-up signal.

15. The communications device according to claim 14, wherein after entry to sleep state, the program or instructions are executed by the processor to perform:

according to the configuration information of the wake-up signal, periodically monitoring for wake-up signal or always monitoring for wake-up signal.

16. The communications device according to claim 12, wherein the program or instructions are executed by the processor to perform:

reporting assistance information to the second communications device, wherein the assistance information is used for the second communications device to determine whether to transmit a sleep state transition command to the first communications device, and the assistance information comprises at least one of the following:

signal strength or signal quality of the first communications device; and a mobility condition of the first communications device.

17. The communications device according to claim 12, wherein the program or instructions are executed by the processor to perform:

receiving second indication information from the second communications device to indicate denial of entering sleep state.

18. A readable storage medium, wherein the readable storage medium stores a program or instructions, and the program or instructions are executed by a processor to perform:

transitioning from non-sleep state to sleep state in a case that at least one of the following is satisfied:

a sleep state transition command from a second communications device has been received; and it has been determined that the first communications device meets a preset sleep state transition condition;

wherein the sleep state transition condition comprises at least one of the following:

received signal quality of the first communications device is higher than a first threshold, or received signal quality of the first communications device is lower than a second threshold;

the first communications device undergoes no cell reselection within a first preset time period;

fluctuation range of received signal quality of the first communications device within a second preset time period is less than a third threshold;

the first communications device receives no paging message or system message within a third preset time period; and continuous camping time of the first communications device in at least one other state than sleep state is longer than a first preset duration;

wherein before the transitioning from non-sleep state to sleep state, the program or instructions are executed by the processor to perform:

transmitting first indication information to the second communications device to indicate that the first communications device enters sleep state;

wherein the first indication information is carried on any one of the following: a random access channel (RACH); a sounding reference signal (SRS); a reference signal (SR); a physical uplink shared channel (PUSCH); a predefined physical channel; or a predefined physical signal.

* * * * *